US009934262B2

(12) United States Patent
Balikov et al.

(10) Patent No.: US 9,934,262 B2
(45) Date of Patent: Apr. 3, 2018

(54) DYNAMIC SHUFFLE RECONFIGURATION

(71) Applicant: Google Inc., Mountain View, CA (US)

(72) Inventors: Alexander Gourkov Balikov, Redmond, WA (US); Marian Dvorsky, Sunnyvale, CA (US); Yonggang Zhao, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/269,276

(22) Filed: Sep. 19, 2016

(65) Prior Publication Data
US 2017/0003936 A1    Jan. 5, 2017

Related U.S. Application Data

(63) Continuation of application No. 14/044,529, filed on Oct. 2, 2013, now Pat. No. 9,483,509.

(51) Int. Cl.
G06F 17/30 (2006.01)
G06F 9/50 (2006.01)

(52) U.S. Cl.
CPC ...... *G06F 17/30312* (2013.01); *G06F 9/5083* (2013.01); *G06F 17/30345* (2013.01); *G06F 17/30584* (2013.01)

(58) Field of Classification Search
None
See application file for complete search history.

(56) References Cited

U.S. PATENT DOCUMENTS

| 8,510,538 B1 | 8/2013 | Malewicz et al. | |
| 8,972,986 B2* | 3/2015 | Palanisamy | G06F 9/5066 718/1 |
| 2012/0311581 A1* | 12/2012 | Balmin | G06F 9/5066 718/100 |
| 2013/0144878 A1* | 6/2013 | James | G06F 17/30525 707/736 |

(Continued)

OTHER PUBLICATIONS

Ibrahim et al., "LEEN: Locality/Fairness-Aware Key Partitioning for MapReduce in the Cloud," 2010 IEEE Second International Conference on Cloud Computing Technology and Science (CLOUDCOM), Nov. 30, 2010, pp. 17-24.

(Continued)

*Primary Examiner* — Christopher J Raab
(74) *Attorney, Agent, or Firm* — Fish & Richardson P.C.

(57) ABSTRACT

A method includes receiving a request to perform a shuffle operation on a data stream, the request including a set of initial key ranges: generating a shuffler configuration that assigns a shuffler from a set of shufflers to each of the initial key ranges; initiating the set of shufflers to perform the shuffle operation on the data stream; analyzing metadata statistics to determine whether a shuffler configuration update event occurs, the metadata statistics produced by the set of shufflers during the shuffle operation and indicating load statistics for each shuffler in the set of shufflers; and upon occurrence of the shuffler configuration update event and during the shuffle operation, altering the shuffler configuration based at least in part on the metadata statistics to produce an assignment of shufflers to key ranges that is different from the assignment of shufflers to the initial key ranges.

20 Claims, 7 Drawing Sheets

(56) References Cited

U.S. PATENT DOCUMENTS

| | | | |
|---|---|---|---|
| 2013/0219394 A1* | 8/2013 | Goldman | G06F 9/5066 718/100 |
| 2013/0297624 A1* | 11/2013 | Raghunathan | G06F 17/30067 707/752 |
| 2014/0067884 A1* | 3/2014 | Tata | G06F 17/30185 707/822 |
| 2014/0310712 A1* | 10/2014 | Meng | G06F 9/5066 718/102 |
| 2015/0095351 A1 | 4/2015 | Balikov et al. | |

OTHER PUBLICATIONS

International Search Report and Written Opinion for International Application No. PCT/US2014/058683, dated Jan. 8, 2015, 11 pages.
Kwon et al., "SkewTune: Mitigating Skew in MapReduce Applications," Proceedings of the 2012 International Conference on Management of Data, SIGMOD'12. May 20-24, 2012, pp. 25-36.
International Preliminary Report on Patentability in International Application No. PCT/US2014/058683, dated Apr. 14, 2016, 7 pages.

* cited by examiner

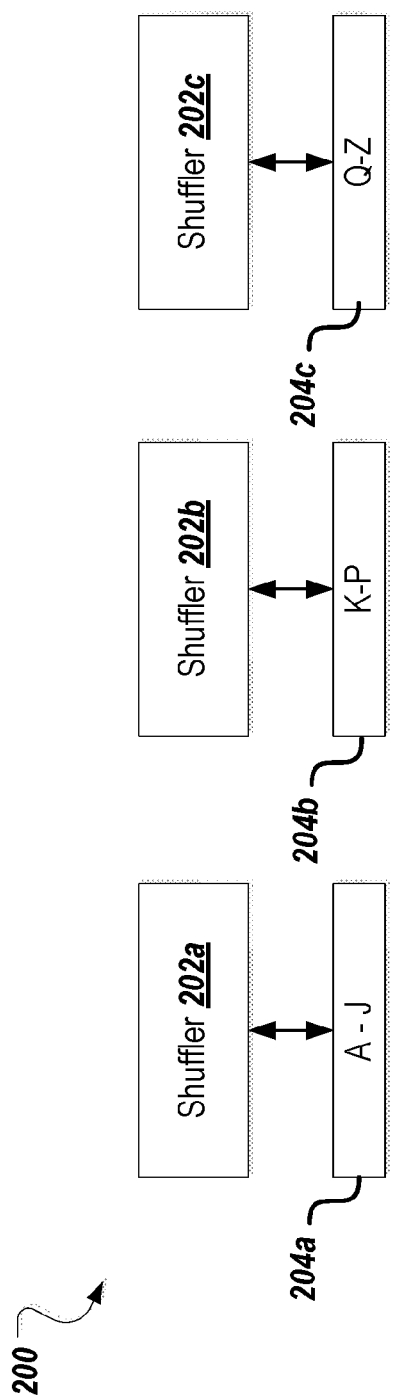
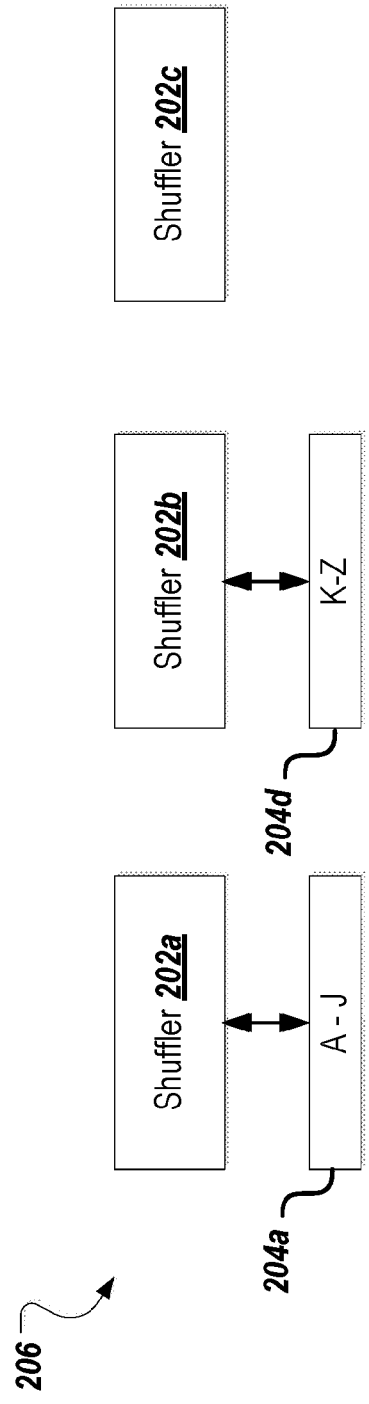

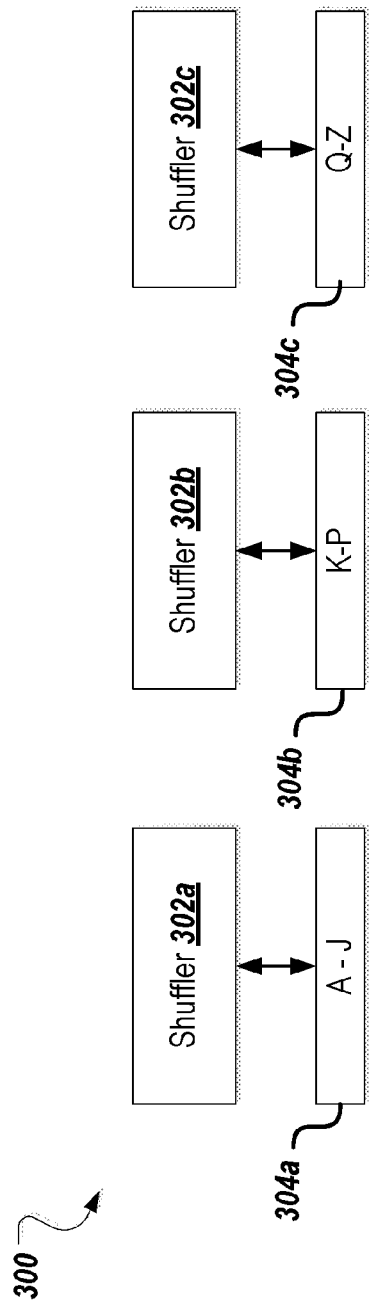
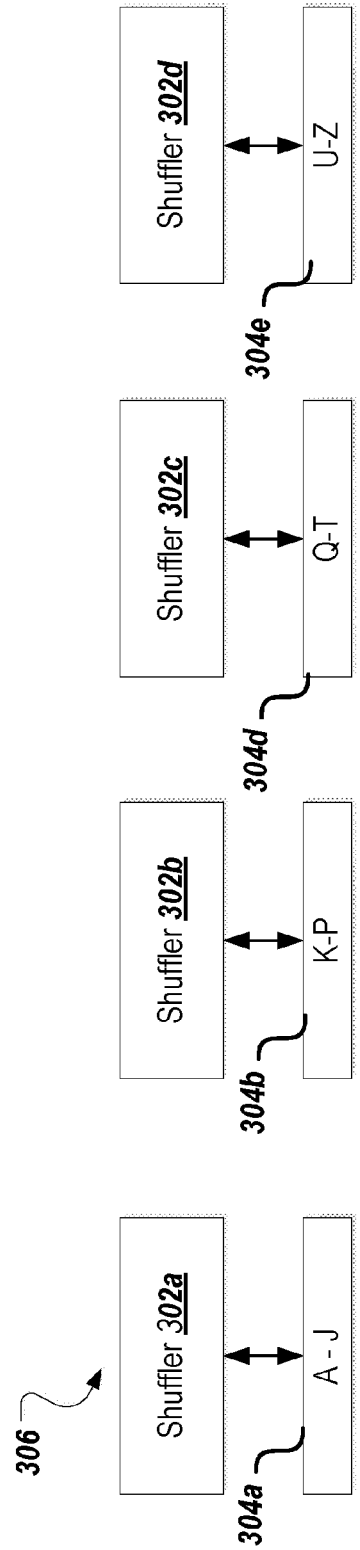

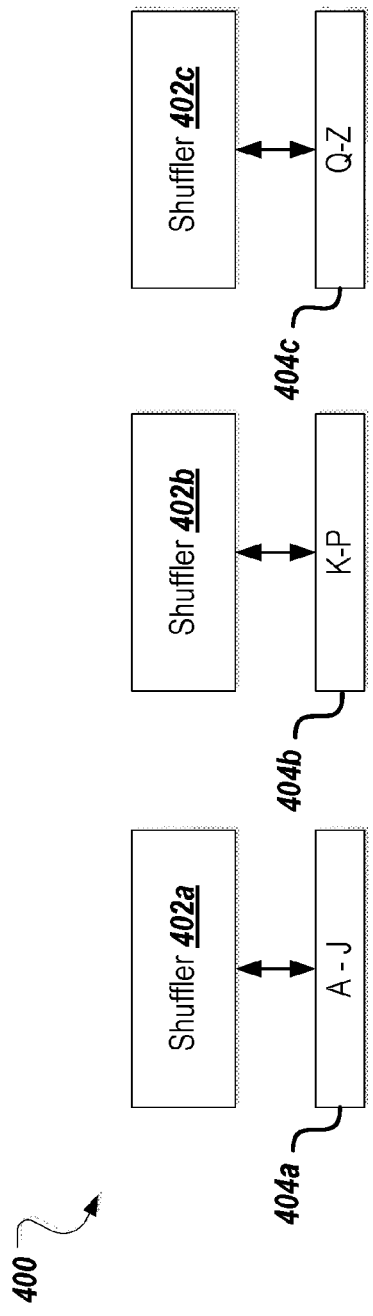
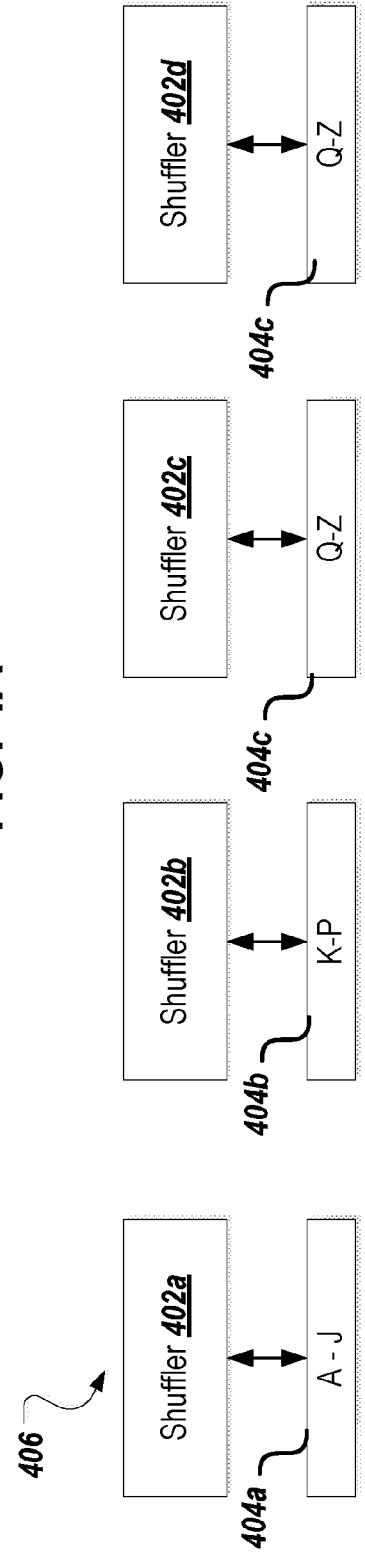
FIG. 4A
FIG. 4B

DYNAMIC SHUFFLE RECONFIGURATION

CLAIM OF PRIORITY

This application claims priority under 35 USC § 120 as a continuation of U.S. patent application Ser. No. 14/044,529, filed on Oct. 2, 2013, the entire contents of which are hereby incorporated by reference.

BACKGROUND

This specification relates to shuffling operations in a distributed data processing system.

A shuffle operation is an intermediate step in a distributed data processing system in which data produced by writers is grouped by key data for consumption by readers. One example of a distributed data processing algorithm that utilizes a shuffle operation is a map reduce algorithm. The writers are implemented in the map phase, during which parallel tasks are created to operate on data to generate intermediate results. In the shuffle phase, the partial computation results of the map phase are arranged for access by readers that implement the reduce operation. During the reduce phase, each reader executes a reduce task that aggregates the data generated by the map phase. Other distributed data processing algorithms also shuffle data by a shuffle operation.

The shuffle operation involves grouping a stream of records according to keys included in the records. The keys may be alphanumeric strings or numerical identifiers. The records may be presented to the shuffle operation by a set of shuffle writers in a random order. A set of shuffler components may receive the records and group them according to their included keys. The shuffler components may then provide the records, now grouped by key, to a set of shuffle readers.

SUMMARY

The subject matter of this application relates to reconfiguring a shuffle operation, such as by changing key range allocations, while the shuffle operation is active. The subject matter of this application relates also relates to storing the results of a shuffle operation in persistent storage for later consumption.

In general, one innovative aspect of the subject matter described in this specification can be embodied in methods that include the actions of responsive to receiving a request to perform a shuffle operation on a data stream, the shuffle operation being an operation that groups keyed records in the data stream by key, the request including a set of initial key ranges, each initial key range corresponding to a portion of the data stream: generating a shuffler configuration that assigns a shuffler from a set of shufflers to each of the initial key ranges, each shuffler configured to receive a portion of the data stream associated with an assigned key range from one or more writers and provide the portion of the data stream to one or more readers; initiating the set of shufflers to perform the shuffle operation on the data stream; analyzing metadata statistics to determine whether a shuffler configuration update event occurs, the metadata statistics produced by the set of shufflers during the shuffle operation and indicating load statistics for each shuffler in the set of shufflers; and upon occurrence of the shuffler configuration update event and during the shuffle operation, altering the shuffler configuration based at least in part on the metadata statistics to produce an assignment of shufflers to key ranges that is different from the assignment of shufflers to the initial key ranges.

Other embodiments of this aspect include corresponding systems, apparatus, and computer programs, configured to perform the actions of the methods, encoded on computer storage devices.

By reconfiguring a shuffle operation while the operation is running, greater efficiency and performance may be achieved. In addition, the ability to reconfigure away from initial key range suggestions may be especially useful when dealing with unbounded data sets or data sets of unknown size, as optimal key ranges may not be discernible when the shuffle operation begins. Accordingly, by allowing such reconfiguration, shuffle operation may be efficiently performed on potentially infinite streams of records.

By storing shuffle operation results in persistent storage, a shuffle operation may be repeated without the need to repeat the step of providing the data to the shufflers. This may be especially useful in cases where large data sets need to be consumed in different ways (e.g., sorted, sharded, etc.) by different consumers. The persistence also allows data producers to be decoupled from the consumers. The producers can produce data regardless of when the data is going to be consumed. The entire produce phase can complete and the producer move to doing other work while the data is persisted in an appropriate format to be consumed later by shuffle consumers. The persistent dataset can also be further reorganized (e.g., sorted, merged) to reduce the amortized processing and storage cost. In addition, persisting the data as described may allow for improved fault tolerance over previous methods, for example, by allowing a shuffle operation to be resumed from a failure point if the handling shuffler fails.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A is a block diagram of an example initial shuffler configuration.

FIG. 2B is a block diagram of an altered shuffler configuration after a key range merge.

FIG. 3A is a block diagram of another example initial shuffler configuration.

FIG. 3B is a block diagram of an altered shuffler configuration after a key range split.

FIG. 4A is a block diagram of another example initial shuffler configuration.

FIG. 4B is a block diagram of an altered shuffler configuration after a key range duplication.

Like reference numbers and designations in the various drawings indicate like elements.

DETAILED DESCRIPTION

A data processing system receives a request to perform a shuffle operation on a data stream. The shuffle operation is an operation that groups keyed records in the data stream by key. The received request includes a set of initial key ranges, into which the keyed records should be grouped during the shuffle operation. The system generates a shuffler configuration that assigns a shuffler to each of the initial key ranges. Each of the shufflers is configured to receive a portion of the data stream associated with the assigned key range from one or more writers. Each shuffler is also configured to provide the received portion of the data stream to one or more readers. In some cases, the readers may consult metadata associated with the shuffle operation to determine which shufflers to contact to consume a particular portion of the data stream. The readers may also consume portions of the data stream directly from persistent storage after it is placed there by the shufflers.

The system initiates the set of shufflers to perform the shuffle operation on the data stream. Each of the shufflers produces metadata statistics during the shuffle operation describing load statistics it is experiencing. The system analyzes these metadata statistics to determine whether the shuffler configuration should be updated to optimize the shuffle operation. One example optimization is, for example, balancing the load among the shufflers. If the system determines that the shuffler configuration should be updated, the system alters the shuffler configuration so that the assignment of shufflers to key ranges is different from the key range assignments prior to the alteration. The alteration is configured according to the desired optimization.

The data processing system may also receive a request to perform a shuffle operation on a data stream, and subsequently receive at least a portion of the data stream from one or more writers. The data stream includes a plurality of records, each including a key. The system may store each of the plurality of records in a persistent storage location. Each persistent storage location is assigned to a key range corresponding to keys included in the plurality of records, and the particular persistent storage location for storing each record is selected based at least in part on the key for the particular record. The system may then receive a request from a consumer for a subset of the plurality of records, including a range of keys. Upon receiving the request, the system provides the subset of the plurality of records from the one or more persistent storage locations, and, if the shuffle operation is still ongoing, may provide any additional records to the requesting reader matching the range of keys.

Figure 1:
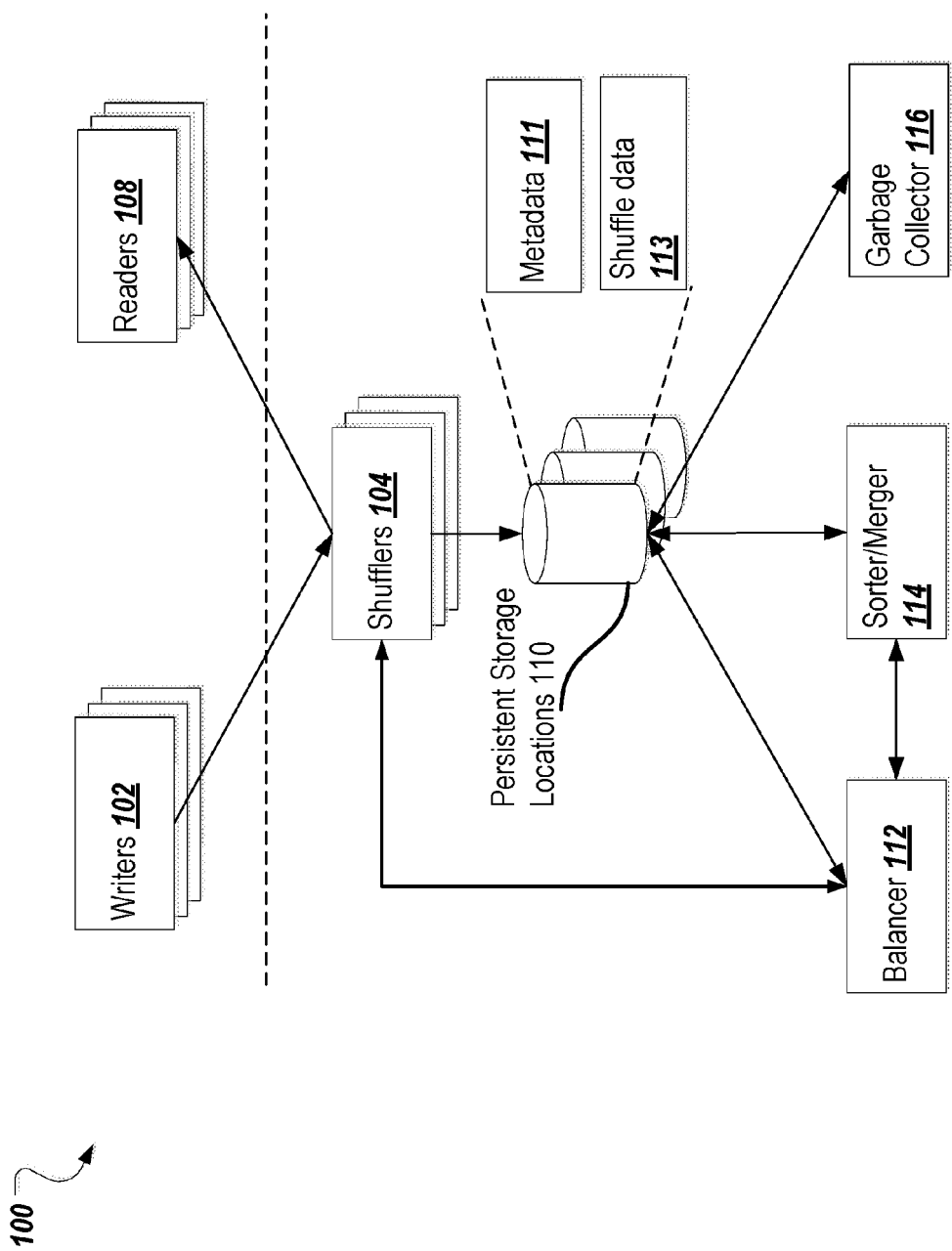
FIG. 1 is a block diagram of an environment in which dynamic reconfiguration of a shuffle operation can occur.

FIG. 1 is a block diagram of an environment 100 in which dynamic reconfiguration of a shuffle operation can occur. The environment 100 includes one or more writers 102 providing a data stream of records to one or more shufflers 104. In some implementations, the writers 102 may be computing devices, such as servers, connected to a network and providing the data stream to the shufflers 104 over such network. The data stream produced by the writers 102 includes a plurality of records each identified by a key. The writers 102 may produce the records in the data stream in Brandon key order to the shufflers 104.

In some implementations, the writers 102 may be mappers participating in a map reduce operation. The writers 102 may also be any type of producer participating in a producer-to-consumer workflow or any other distributed data processing system flow.

The shufflers 104 receive the records in the data stream from the writers 102. In operation, the shufflers 104 group the records in the data stream by key. In some implementations, each of the shufflers 104 may be assigned a key range, and may be responsible for grouping records in the data stream with keys that fall within the assigned key range. For example, if a shuffler was assigned a key range of "A" through "G", the shuffler would be responsible for grouping a record produced by the writers 102 including a key of "B."

In some implementations, the shufflers 104 may be computing devices operating on a network, and receiving the data stream from the writers 102. The shufflers 104 may include integrated or associated storage for storing received records from the writers 102 during the shuffle operation. The shufflers 104 may be included in a larger pool of shufflers, and may be assigned to different shuffle operations over time. In addition, the shufflers 104 may perform multiple shuffle operations at the same time.

In operation, the shufflers 104 may provide the records of the data stream grouped by key to one or more readers 108. In some implementations, the one or more readers 108 may be reducers participating in a map reduce operation. The one or more readers 108 may also be consumers dissipating a producer-to-consumer operation. The readers 108 may also be clients receiving data stream records provided by the writers 102.

In some implementations, the writers 102, the shufflers 104, and the readers 108 communicate according to a standard Application Programming Interface (API) or protocol, such as, for example, Hypertext Transfer Protocol (HTTP), Simple Object Access Protocol (SOAP), or any other suitable API or protocol. The writers 102, shufflers 104, and readers 108 may also communicate with each other via the network (not shown), such as an Internet Protocol (IP) network.

As shown, the environment 100 also includes one or more persistent source locations 110. In operation, the shufflers 104 may store records received from the writers 102 in the persistent storage locations 110 during the shuffle operation. For example, if the shuffler 104 receives records from the writers 102 that have not been requested by the readers 108 yet, the shuffler 104 may store the records in local resources, such as Random Access Memory (RAM) or disk, until the data is requested. However, if the shuffler 104 receives more records than a can store and its local resources, it may begin storing records to one of the persistent storage locations 110. In some implementations, the persistent storage locations 110 may be servers including portions of a distributed database (e.g., shards). The persistent storage locations 110 may include any type of nonvolatile storage. In some cases, the persistent storage locations 110 may be nodes within a Storage Area Network (SAN). The persistent storage locations 110 may also be locations within a distributed file system, or within a file system local to each of the persistent storage locations 110.

In some implementations, the shuffle operation performed by the shufflers 104 may be designated as a persistent shuffle operation, as described in more detail below. In such a case, the shufflers 104 may store all records received from the writers 102 in persistent storage locations 110 until instructed to delete the records. Storing the records in this manner may allow multiple of the readers 108 to consume the same set of records in different ways, such as sorted and not sorted, and may allow a shuffle operation to be repeated without the writers 102 having to provide the records in the data stream to the shufflers one of four second time.

Metadata 111 may also be produced by the shufflers 104 during the shuffle operation. In some cases, the metadata 111 are stored in the persistent storage locations 110. Metadata 111 may also be monitored by the balancer 112. In such a case, the metadata 111 may be produced according to a network management protocol such as Simple Network Management Protocol (SNMP).

The metadata 111 may indicate load conditions associated with the one or more shufflers 104. For example, one of the shufflers 104 may produce metadata 111 indicating that its processor usage is 100% at a particular time, while another one of the shufflers 104 may produce metadata 111 indicating that its processor usage is at 50%. In another example, one of the shufflers 104 may produce metadata 111 indicating that it is handling twice the amount of data as another shuffler, which may indicate that a rebalancing of key range assignments is necessary.

The metadata 111 may be analyzed by a balancer 112 to determine whether the shuffle operation should be reconfigured based on the load on the one or more shufflers 104. The balancer 112 may monitor the metadata 111 during the shuffle operation and perform reconfiguration of the shufflers 104 when it determines reconfiguration is necessary. This determination can be based on criteria that are particular for a desired optimization. For example, if the metadata 111 indicates that one of the shufflers 104 has a high load factor, while another one of the shufflers 104 has a low load factor, the balancer 112 may change the key ranges assigned to the shufflers 104 such that the shuffler with a high load factor is assigned a smaller key range, and the shuffler with a low load factor is assigned a larger key range. In some implementations, the balancer 112 may be a separate component or set of components from the shufflers 104. The balancer 112 may receive indications from the shufflers 104 of the metadata 111. The balancer 112 may also read the metadata 111 from the persistent storage locations 110. The shuffle reconfiguration is described in more detail relative to FIGS. 2A, 2B, 3A, 4b, 4A, and 4B.

The metadata 111 may also include the mapping of key range to storage location (e.g., shard) so that the readers consuming a particular key range can determine which persistence storage location to read in a persistent shuffle operation.

The metadata 111 may also include information created by the readers 108 related to the consumption of the data set from the shufflers 104. For example, the readers 108 may each create a metadata record indicating their current position within a data set. Such a current position may indicate that a particular reader has consumed all records in the data set prior to the position. Such position metadata may be used by the garbage collector 116 to determine when shuffle data may be garbage collected due to the data having been consumed by all of the readers 108 that are configured to receive it.

The persistent storage locations 110 also contain shuffle data 113. In some cases, the shuffle data 113 may be data received by the shufflers 104 on which the shuffle operation has been performed. In such a case, the data may be stored in the persistent storage locations 110 in a shuffled state so that it can be provided to the readers 108. In some implementations, the shuffle data 113 may be stored within the persistent storage locations 110 until it is consumed by each of the readers 108 that is configured to receive it. The shuffle data 113 may also be stored in the persistent storage locations 110 until the associated shuffle operation completes.

In some cases, the readers 108 may read shuffle data 113 from the persistent storage locations 110 instead of or in addition to receiving data from the shufflers 104. For example, a reader 108 may consult the metadata 111 to determine which of the persistent storage locations 110 stores a particular portion of the shuffle data 113. The reader 108 may then contact the persistent storage location 110 to retrieve data, such as by reading from a sequential file, selecting the data from a database, querying the persistent storage location 110 via an API, and/or by other mechanisms.

A sorter/merger 114 performs sort and merge operations on the records grouped by the shufflers 104. For example, if the shuffle operation is configured such that the records should be provided to the readers 108 sorted by key order, the shufflers 104 may pass the records to the sorter/merger to perform these operations. In some implementations, the sorter/merger 114 receives the records from the shufflers 104 and sorts them as they are received. The sorter/merger 114 may provide the records to the readers 108 in sorted batches, such that all records within a given batch are sorted by key order. The sorter/merger 114 may also combine multiple sorted portions of the data stream into a larger sorted set, and provide that sorted set to the readers 108.

The garbage collector 116 monitors the various components of the shuffle operation, and deallocates resources associated with the components. In some cases, the garbage collector 116 may deallocate resources when requested by another component. The garbage collector 116 may also perform garbage collection automatically, such as by determining when a resource is no longer used by any component associated with the shuffle operation and deallocating the resource. For example, the garbage collector 116 may receive an indication that a portion of the data stream has been consumed by the readers 108. The garbage collector 116 may then perform a garbage collection operation to deallocate the resources associated with this portion of the data stream.

FIG. 2A is a block diagram of an example initial shuffler configuration 200. Such a shuffler configuration may be produced when the shuffle operation is initiated. As shown, the initial shuffler configuration 200 includes one or more initial key ranges 204a-c. In some implementations, the initial key ranges 204a-c are provided by a program, entity, or user that has initiated the shuffle operation. A variety of appropriate key range assignment processes can be used. The initial key ranges 204a-c are each assigned to one of the shufflers 202a-c. In some cases, this initial assignment is performed by the balancer 112, such as, for example, by dividing the key space into equal sized key ranges and assigning each key range to one of the shufflers 104. Statistics related to previous runs can also be used to determine the initial key range splits of subsequent runs in case of repeated data processing runs over data from the same source.

FIG. 2B is a block diagram of an altered shuffler configuration 206 after a key range merge. As shown, the balancer 112 has merged key ranges 204b and 204c into a single key range 208 including both key ranges, and assigned the key range 208 to shuffler 202b. The merged key range 208 includes a union of the key ranges 204b and 204c. Shuffler 202c is no longer assigned a key range, and thus the balancer may deallocate it from the shuffle operation, such as by returning it to a pool of available shufflers. In some cases, the balancer 112 may perform the illustrated merge operation in response to detecting that shufflers 202b and 202c were operating below a load threshold indicating that they were underutilized in the shuffle operation. For example, the balancer 112 may detect that the shufflers 202b and 202c have processor utilization measures under a certain percentage, and determine that the shufflers 202b and 202c are operating below the load threshold. By merging the two adjacent key ranges 204b in 204c into key range 204d, the balancer 112 may increase the load on shuffler 202b, the shuffler 202b is now assigned a larger key range and presumably will receive more records from the writers 102. Although this example shows two key ranges being merged into one key range, the balancer 112 may merge three or more adjacent key ranges at a time. The balancer 112 may also perform multiple merges at once, such as producing two key ranges from five original key ranges.

In addition to the above operations, the balancer 112 may also replicate key ranges such that multiple shufflers will handle the same key range, in effect splitting the load for that key range between multiple shufflers.

FIG. 3A is a block diagram of another example initial shuffler configuration 300. Such a shuffler configuration may be produced when the shuffle operation is initiated. As shown, the initial shuffler configuration 300 includes one or more initial key ranges 304a-c. In some implementations, the initial key ranges 304a-c are provided by a program, entity, or user that is initiated the shuffle operation. The initial key ranges 304a-c are each assigned to one of the shufflers 302a-c. In some cases, this initial assignment is performed by the balancer 112.

FIG. 3B is a block diagram of an altered shuffler configuration 306 after a key range split. As shown, the balancer 112 has split key range 304c into two new key ranges 304d and 304e. The balancer 112 has assigned new key range 304d shuffler 302c, and new key range 304e additional shuffler 302d. In some implementations, the balancer 112 may allocate additional shufflers, such as shuffler 302d, during a shuffle operation to handle new key ranges, such as those produced by a split. The balancer 112 may perform the illustrated split operation in response to an indication that shuffler 302c is experiencing a high load condition, such as processor or memory usage exceeding a threshold. By splitting the key range 304c into the two key ranges 304d and 304e, the balancer 112 may balance the load on shuffler 302c between shuffler 302c and additional shuffler 302d, as presumably splitting the key range will also split the records in the data stream between the shuffler 302c and the shuffler 302d.

FIG. 4A is a block diagram of another example initial shuffler configuration 400. Such a shuffler configuration may be produced when the shuffle operation is initiated. As shown, the initial shuffler configuration 400 includes one or more initial key ranges 404a-c. In some implementations, the initial key ranges 404a-c are provided by a program, entity, or user that is initiated the shuffle operation. The initial key ranges 404a-c are each assigned to one of the shufflers 402a-c. In some cases, this initial assignment is performed by the balancer 112.

FIG. 4B is a block diagram of an altered shuffler configuration 406 after a key range duplication. As shown, the balancer 112 has allocated an additional shuffler 402d, and assigned the key range 404c to both the shuffler 402c and the additional shuffler 402d. In some cases, this duplication of key ranges may be used as a proactive measure to deal with slow/failed shufflers. When a shuffler becomes slow or fails, a writer can fall back to a different shuffler handling the same key-range. Such an adjustment may be made by the writer faster than the balancer 112 may observe the slow or failed shuffler and reassign key range to compensate.

Figure 5:
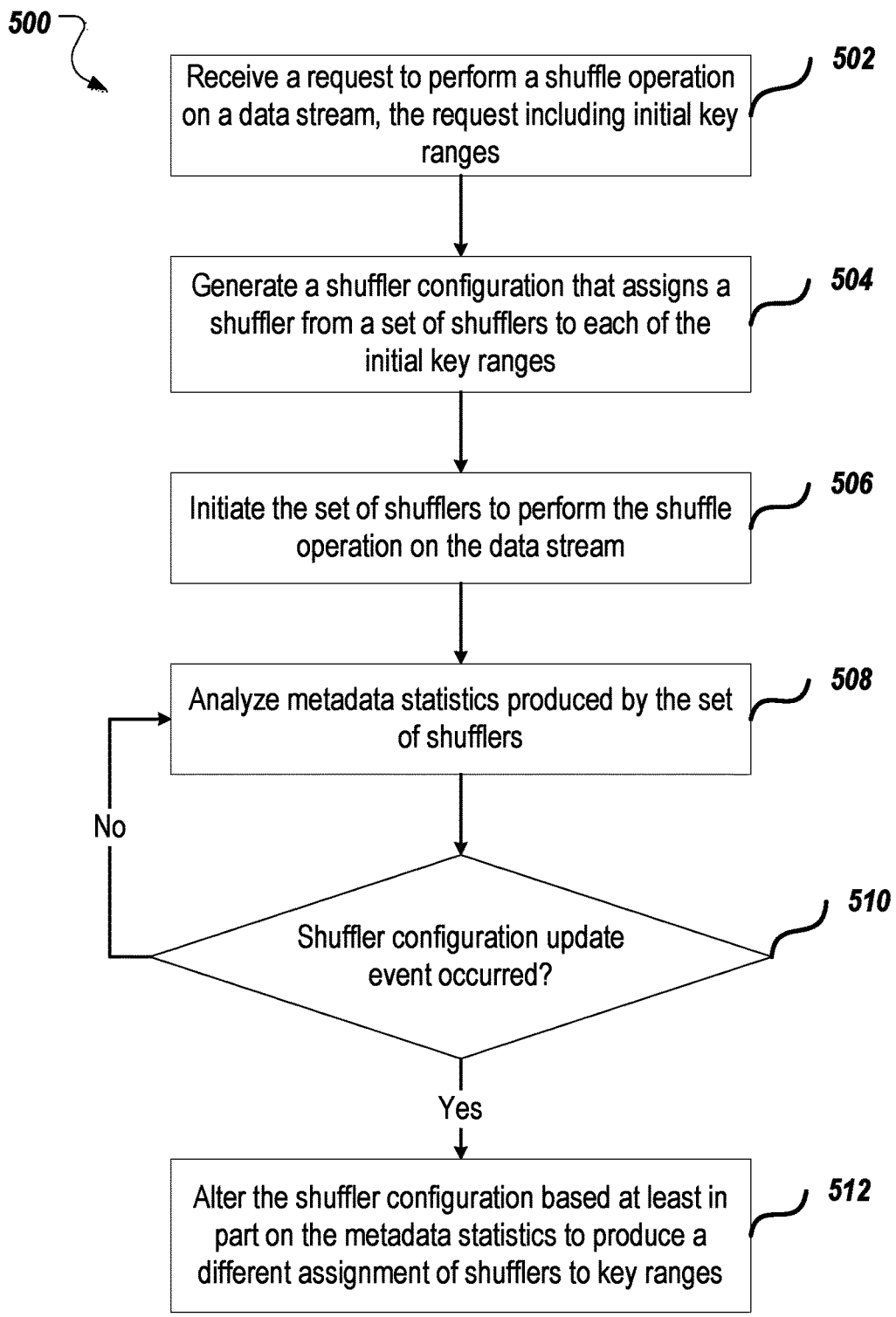
FIG. 5 is a flow diagram of an example process for dynamic reconfiguration of a shuffle operation.

FIG. 5 is a flow diagram of an example process 500 for dynamic reconfiguration of a shuffle operation. The process 500 can be implemented by the balancer 112. The balancer 112 receives a request to perform a shuffle operation on a data stream, the request including initial key ranges (502). For example, the balancer 112 may receive a request from an entity to perform a shuffle operation as part of a larger data operation, such as a map reduce, a producer-to-consumer workflow, or any other suitable operation.

The balancer 112 generates the shuffler configuration that assigns a shuffler from a set of shufflers 104 to each of the initial key ranges (504). In some implementations, the balancer 112 may assign two or more shufflers to particular initial key ranges is such a configuration is requested, or if the balancer 112 determines that such a configuration is necessary. In some cases, the balancer 112 may store the shuffler configuration in a persistent storage location 110.

The balancer 112 initiates the set of shufflers 104 to perform the shuffle operation on the data stream (506). In some cases, the balancer 112 may send a network message to each of the shufflers 104 indicating an assigned initial key range or ranges, and indicating the shuffle operation is beginning.

The balancer 112 analyzes metadata 111 produced by the set of shufflers 104. In some implementations, the balancer 112 receives the metadata 111 over the network via a management protocol such as SNMP. The balancer 112 may also read the metadata 111 from the persistent storage locations 110 as the metadata 111 or written to persistent storage locations 110 by the shufflers 104.

The balancer 112 determines if a shuffler configuration event has occurred (510). In some cases, the balancer may compare the metadata 111 produced by the shufflers 104 to configured thresholds indicating load values above or below which a shuffler configuration update should occur. For example, the balancer 112 may be configured with a threshold stating that the shuffler having a processor usage above 90% should trigger a shuffler configuration update.

If the balancer 112 determines the shuffler configuration update has not occurred, the process 500 returns to 508. If the balancer 112 determines that the shuffler configuration update has occurred, the process 500 continues to 512, where the balancer 112 alters the shuffler configuration based at least in part on the metadata 111 to produce a different assignment of shufflers to key ranges. In some implementations, the balancer 112 may perform the key range alteration operations described in FIGS. 2A, 2B, 3A, 3B, 4A, and 4B, or any suitable combination of these key range alteration operations.

In some cases, the balancer 112 identifies a first key range associated with a first shuffler, and determines that the first shuffler is experiencing a high load condition based at least in part on the metadata 111. The balancer 112 reassigns the first shuffler to a revised key range that includes a subset of the first key range. In some cases, the balancer 112 may determine that the first shuffler is experiencing a low load condition based at least in part on the metadata statistics, and reassign the first shuffler to a revised key range that includes the first key range and a second key range different than the first key range. The balancer 112 may also reassign revised key ranges in an effort to keep the data involved in the shuffle operation split evenly across the various shufflers.

In some implementations, the garbage collector 116 may identify an indication that a portion of the data stream has been consumed by the one or more readers 108. The garbage collector 116 may then perform a garbage collection operation on one or more resources associated with the portion of the data set.

In some cases, the garbage collector 116 may receive consumption metadata from the one or more readers, the consumption metadata indicating consumption progress for the data set for each of the one or more readers. The consumption metadata may also be stored in one of the persistent storage locations 110 and read by the garbage collector 116. In some implementations, the consumption metadata may indicate a current place within the data set or within a portion of the data set (e.g., a shard) up to which a particular reader has consumed. The garbage collector 116 may perform a garbage collection operation on one or more resources associated with the data set if the consumption metadata indicates that the portion of the data set associated with the one or more resources has been consumed. For example, if all readers consuming a data set have consumed past a certain point in the data set, the garbage collector 116 may delete resources associated with the portion of the data set before that certain point.

Figure 6:
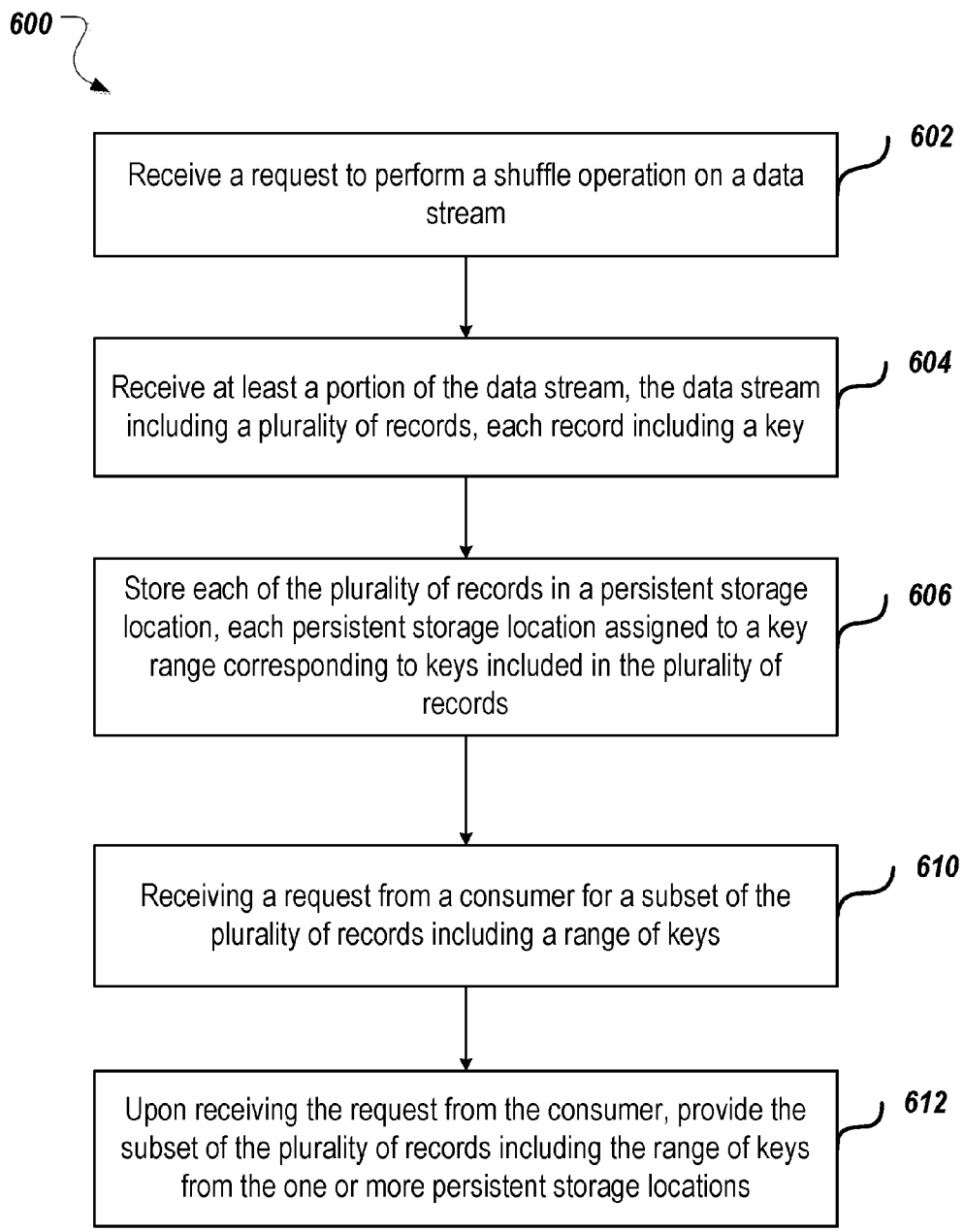
FIG. 6 is a flow diagram of an example process for performing a persistent shuffle operation.

FIG. 6 is a flow diagram of an example process 600 for performing a persistent shuffle operation. The process 600 can be implemented by a shuffler 104. The shuffler 104 receives a request to performer shuffle operation on a data stream (602). In some implementations, the request perform the shuffle operation may be received by a supervisor component, such as a shuffle master.

The shuffler 104 receives at least a portion of the data stream, the data stream including a plurality of records, each record including a key (604). In some implementations, the shuffler 104 receives the portion of the data stream from the one or more writers 102.

The shuffler 104 stores each of the plurality of records in a persistent storage location 110 (606). Each persistent storage location 110 is assigned to a key range corresponding to keys included in the plurality of records. In some implementations, the persistent storage locations 110 are shards of a distributed database. The persistent storage locations 110 may also be sequential files stored in a file system on a server or set of servers.

The shuffler 104 receives a request from a consumer for a subset of the plurality of records including a range of keys (610). In some implementations, the request may include an identifier indicating the stored persistent shuffle operation from which to pull records corresponding to the range of keys. In some cases, multiple persistent shuffle operations may be active at once, which may necessitate such an identifier.

Upon receiving the request from the consumer, the shuffler 104 provides the subset of the plurality of records for the range of keys requested by the consumer from the one or more persistent storage locations 110 (612). In some cases, the shuffler 104 may query the database containing the plurality of records and provide the records to the consumer. The consumer may be one of the one or more readers 108.

In some cases, the shuffler 104 receives a data consumption mode selection associated with the shuffle operation indicating a manner in which records should be provided to consumers. The data consumption mode selection may include a sharded mode selection indicating that the plurality of records should be provided to the consumer only after being stored in the one or more persistent storage locations 110. The data consumption mode selection may include a sharded mode selection indicating that the plurality of records should be provided to the consumer, only after being stored in the one or more persistent storage locations 110. The data consumption mode selection may also include a sorted mode selection indicating that the plurality of records should be provided to the consumer grouped and ordered by key. In such a case, the shuffler 104 may interact with sorter/merger 114 to provide the plurality of records in this manner. The sorted mode selection may also indicate a particular sorter application or particular sorting order in which to provide the records.

In some implementations, the shuffler 104 may store metadata associated with the shuffle operation in the persistent storage locations 110. Metadata may include indexes associated with the plurality of records. In some implementations, the shuffler 104 may provide the readers stream position information while reading the data, enabling the readers to track their reading progress. In the case that a reader needed to restart reading from the shufflers, the readers could use this position info to tell the shufflers where to start reading. This may allow the readers to avoid starting over at the beginning of the data stream.

In some cases, the shuffler 104 or the garbage collector 116 may receive a request to delete the shuffle operation. Upon receiving the request to delete the shuffle operation, the shuffler 104 or the garbage collector 116 may delete each of the plurality of records from the one or more persistent storage locations 110. In some implementations, the garbage collector 116 may delete all resources for a completed shuffle operation. The garbage collector 116 may also delete resources associated with data that has already been consumed, which may be important during an infinite shuffle as resources will need to be freed in order for the shuffle to continue.

The persistent storage locations 110 may append a particular record to an end of a sequential file for storage, and may track one or more next read locations in the sequential file, each of the one or more next read locations indicating a next record to deliver to each of one or more readers. For example, if a first reader has received all records until the fourth record in the sequential file, the next read location for the first reader would be the fourth record. At the second reader has received all records until the seventh record in the sequential file, the next read location for the second reader would be to seventh record. In some implementations, the persistent storage locations 110 store these next read locations with the sequential file. The persistent storage locations 110 may also store the next read locations in a central storage location.

Figure 7:
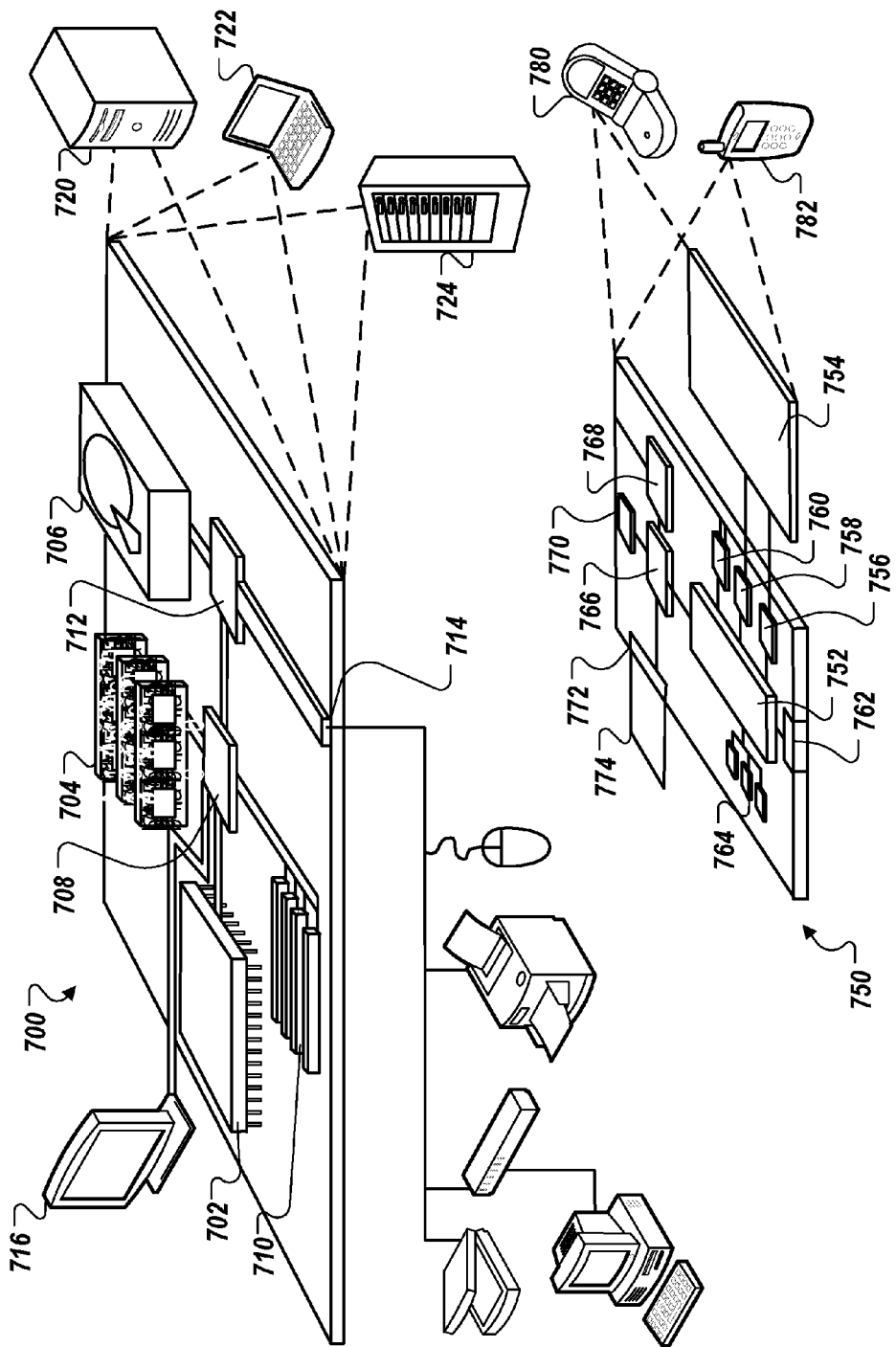
FIG. 7 is a block diagram of an example computing device.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed interface 708 manages bandwidth-intensive operations for the computing device 700, while the low speed interface 712 manages lower bandwidth-intensive operations. Such allocation of functions is exemplary only. In one implementation, the high-speed interface 708 is coupled to memory 704, display 716 (e.g., through a graphics processor or accelerator), and to high-speed expansion ports 710, which may accept various expansion cards (not shown). In the implementation, low-speed interface 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 752 may be a CISC (Complex Instruction Set Computers) processor, a RISC (Reduced Instruction Set Computer) processor, or an MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory 764 may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing apparatus, the method comprising:
    receiving a request to perform a shuffle operation on a data stream, the shuffle operation being an operation that groups keyed records in the data stream by key;
    receiving at least a portion of the data stream, the data stream comprising a plurality of records, each record including a key, and the request including an initial key range corresponding to a portion of the data stream; and
    during the shuffle operation that groups keyed records in the data stream by key and after the shuffle operation has been performed on a subset of the records in the at least portion of the data stream:
        analyzing metadata statistics produced by a shuffler, the shuffler configured to receive a portion of the data stream associated with an initial assigned key range from one or more writers, group records of the received portion of the data stream by key, and provide the grouped records of the portion of the data stream associated with the initial assigned key range to one or more readers;
        determining whether to reconfigure the shuffle operation based at least on the metadata statistics produced by the shuffler during the shuffle operation; and
        in response to determining to reconfigure the shuffle operation based at least on the metadata statistics produced by the shuffler during the shuffle operation, changing the initial assigned key range for the shuffler that groups records to a new assigned key range for the shuffler that is different than the initial assigned key range for the shuffler.

2. The method of claim 1, wherein the metadata statistics produced by the shuffler indicate load statistics for the shuffler.

3. The method of claim 1, wherein changing the initial assigned key range for the shuffler to a new assigned key range for the shuffler that is different than the initial assigned key range for the shuffler comprises merging two or more key ranges to produce a merged key range and assigning the merged key range to the shuffler, the merged key range including a union of the ranges of keys associated with the two or more key ranges.

4. The method of claim 1, wherein changing the initial assigned key range for the shuffler to a new assigned key range for the shuffler that is different than the initial assigned key range for the shuffler comprises splitting a key range to produce two or more split key ranges and assigning at least one of the two or more split key ranges to the shuffler.

5. The method of claim 1, wherein analyzing the metadata statistics produced by the shuffler comprises:
   determining that the shuffler is experiencing a high load condition based at least in part on the metadata statistics; and
   wherein the new assigned key range for the shuffler that is different than the initial assigned key range for the shuffler comprises a subset of the initial assigned key range.

6. The method of claim 1, wherein analyzing the metadata statistics produced by the shuffler comprises:
   determining that the shuffler is experiencing a low load condition based at least in part on the metadata statistics; and
   wherein the new assigned key range for the shuffler that is different than the initial assigned key range for the shuffler comprises the initial assigned key range and a second key range different than the initial assigned key range.

7. The method of claim 1, further comprising:
   identifying an indication that a portion of the data stream has been consumed by the one or more readers; and
   performing a garbage collection operation on one or more resources associated with the portion of the data set.

8. The method of claim 1, further comprising:
   receiving consumption metadata from the one or more readers, the consumption metadata indicating consumption progress for the data set for each of the one or more readers; and
   performing a garbage collection operation on one or more resources associated with the data set if the consumption metadata indicates that the portion of the data set associated with the one or more resources has been consumed.

9. The method of claim 1, comprising:
   in response to receiving the request to perform the shuffle operation on the data stream and before determining whether to reconfigure the shuffle operation based at least on the metadata statistics produced by the shuffler during the shuffle operation, configuring a set of shufflers including the shuffler to perform the shuffler operation on the data stream.

10. A non-transitory computer-readable medium storing instructions that are operable, when executed, to cause one or more processors to perform operations comprising:
   receiving a request to perform a shuffle operation on a data stream, the shuffle operation being an operation that groups keyed records in the data stream by key;
   receiving at least a portion of the data stream, the data stream comprising a plurality of records, each record including a key, and the request including an initial key range corresponding to a portion of the data stream; and
   during the shuffle operation that groups keyed records in the data stream by key and after the shuffle operation has been performed on a subset of the records in the at least portion of the data stream:
      analyzing metadata statistics produced by a shuffler, the shuffler configured to receive a portion of the data stream associated with an initial assigned key range from one or more writers, group records of the received portion of the data stream by key, and provide the grouped records of the portion of the data stream associated with the initial assigned key range to one or more readers;
      determining whether to reconfigure the shuffle operation based at least on the metadata statistics produced by the shuffler during the shuffle operation; and
      in response to determining to reconfigure the shuffle operation based at least on the metadata statistics produced by the shuffler during the shuffle operation, changing the initial assigned key range for the shuffler that groups records to a new assigned key range for the shuffler that is different than the initial assigned key range for the shuffler.

11. The computer-readable medium of claim 10, wherein the metadata statistics produced by the shuffler indicate load statistics for the shuffler.

12. The computer-readable medium of claim 10, wherein changing the initial assigned key range for the shuffler to a new assigned key range for the shuffler that is different than the initial assigned key range for the shuffler comprises merging two or more key ranges to produce a merged key range and assigning the merged key range to the shuffler, the merged key range including a union of the ranges of keys associated with the two or more key ranges.

13. The computer-readable medium of claim 10, wherein changing the initial assigned key range for the shuffler to a new assigned key range for the shuffler that is different than the initial assigned key range for the shuffler comprises splitting a key range to produce two or more split key ranges and assigning at least one of the two or more split key ranges to the shuffler.

14. The computer-readable medium of claim 10, wherein analyzing the metadata statistics produced by the shuffler comprises:
   determining that the shuffler is experiencing a high load condition based at least in part on the metadata statistics; and
   wherein the new assigned key range for the shuffler that is different than the initial assigned key range for the shuffler comprises a subset of the initial assigned key range.

15. The computer-readable medium of claim 10, wherein analyzing the metadata statistics produced by the shuffler comprises:
   determining that the shuffler is experiencing a low load condition based at least in part on the metadata statistics; and
   wherein the new assigned key range for the shuffler that is different than the initial assigned key range for the shuffler comprises the initial assigned key range and a second key range different than the initial assigned key range.

16. The computer-readable medium of claim 10, further comprising:
   identifying an indication that a portion of the data stream has been consumed by the one or more readers; and performing a garbage collection operation on one or more resources associated with the portion of the data set.

17. The computer-readable medium of claim 10, further comprising:
receiving consumption metadata from the one or more readers, the consumption metadata indicating consumption progress for the data set for each of the one or more readers; and
performing a garbage collection operation on one or more resources associated with the data set if the consumption metadata indicates that the portion of the data set associated with the one or more resources has been consumed.

18. A system comprising:
memory for storing data; and
one or more processors operable to perform operations comprising:
receiving a request to perform a shuffle operation on a data stream, the shuffle operation being an operation that groups keyed records in the data stream by key;
receiving at least a portion of the data stream, the data stream comprising a plurality of records, each record including a key, and the request including an initial key range corresponding to a portion of the data stream; and
during the shuffle operation that groups keyed records in the data stream by key and after the shuffle operation has been performed on a subset of the records in the at least portion of the data stream:
analyzing metadata statistics produced by a shuffler, the shuffler configured to receive a portion of the data stream associated with an initial assigned key range from one or more writers, group records of the received portion of the data stream by key, and provide the grouped records of the portion of the data stream associated with the initial assigned key range to one or more readers;
determining whether to reconfigure the shuffle operation based at least on the metadata statistics produced by the shuffler during the shuffle operation; and
in response to determining to reconfigure the shuffle operation based at least on the metadata statistics produced by the shuffler during the shuffle operation, changing the initial assigned key range for the shuffler that groups records to a new assigned key range for the shuffler that is different than the initial assigned key range for the shuffler.

19. The system of claim 18, wherein the metadata statistics produced by the shuffler indicate load statistics for the shuffler.

20. The system of claim 18, wherein changing the initial assigned key range for the shuffler to a new assigned key range for the shuffler that is different than the initial assigned key range for the shuffler comprises merging two or more key ranges to produce a merged key range and assigning the merged key range to the shuffler, the merged key range including a union of the ranges of keys associated with the two or more key ranges.

* * * * *